US008681446B2

(12) United States Patent
Hutchinson et al.

(10) Patent No.: US 8,681,446 B2
(45) Date of Patent: Mar. 25, 2014

(54) METHODS AND DEVICES INCLUDING MULTIPLE RESISTIVE HEATING ELEMENTS

(75) Inventors: Erik Jon Hutchinson, Eden Prairie, MN (US); Bradley Hugh Miller, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 76 days.

(21) Appl. No.: 13/332,965

(22) Filed: Dec. 21, 2011

(65) Prior Publication Data

US 2013/0163108 A1   Jun. 27, 2013

(51) Int. Cl.
*G11B 5/02* (2006.01)

(52) U.S. Cl.
USPC .......................................................... 360/59

(58) Field of Classification Search
USPC ........ 360/59, 75, 125.31, 125.74, 294.7, 126, 360/122, 123, 317, 125, 128
See application file for complete search history.

(56) References Cited

U.S. PATENT DOCUMENTS

| 5,303,105 | A | * | 4/1994 | Jorgenson | .................. 360/294.3 |
| 6,909,578 | B1 | | 6/2005 | Missell et al. | |
| 7,079,353 | B2 | | 7/2006 | Hsiao et al. | |
| 7,133,254 | B2 | * | 11/2006 | Hamann et al. | .......... 360/125.74 |
| 7,199,974 | B1 | * | 4/2007 | Alfoqaha | ................. 360/123.09 |
| 7,403,354 | B2 | * | 7/2008 | Pust et al. | ................ 360/125.31 |
| 7,483,234 | B2 | | 1/2009 | Shimozato | |
| 7,551,406 | B1 | * | 6/2009 | Thomas et al. | ............... 360/317 |
| 7,573,682 | B2 | * | 8/2009 | Pust et al. | .................. 360/294.7 |
| 7,729,086 | B1 | * | 6/2010 | Song et al. | ............... 360/125.31 |
| 7,729,087 | B1 | * | 6/2010 | Stoev et al. | ............. 360/125.74 |
| 7,848,056 | B2 | | 12/2010 | Sakamoto et al. | |
| 7,898,767 | B2 | * | 3/2011 | Yamanaka et al. | ........ 360/125.31 |
| 8,174,791 | B2 | * | 5/2012 | Aoki | ........................ 360/125.31 |
| 8,213,117 | B2 | * | 7/2012 | Antoku et al. | ........... 360/125.31 |
| 8,315,016 | B2 | * | 11/2012 | Furukawa et al. | ........ 360/125.31 |
| 2005/0237673 | A1 | * | 10/2005 | Mizoguchi et al. | ........... 360/313 |
| 2006/0171076 | A1 | * | 8/2006 | Lille | .......................... 360/234.5 |
| 2007/0035881 | A1 | | 2/2007 | Burbank et al. | |
| 2009/0323222 | A1 | * | 12/2009 | Hirata et al. | ............... 360/245.3 |
| 2011/0267715 | A1 | * | 11/2011 | Heim et al. | ..................... 360/59 |

* cited by examiner

*Primary Examiner* — Nabil Hindi
(74) *Attorney, Agent, or Firm* — Braden Katterheinrich

(57) ABSTRACT

In certain embodiments, a head includes a writer portion having coils positioned near a writer, a reader portion separate from the writer portion and a single-layer heating circuit positioned near the writer portion. The heating circuit includes at least two resistive elements.

In certain embodiments, a slider includes a single layer heating circuit including at least two heating element resistors.

19 Claims, 6 Drawing Sheets

METHODS AND DEVICES INCLUDING MULTIPLE RESISTIVE HEATING ELEMENTS

SUMMARY

Certain embodiments of the present disclosure are generally directed to methods and devices including sliders with multiple resistive heating elements.

In certain embodiments, a head includes a writer portion having coils positioned near a writer, a reader portion separate from the writer portion, and a single-layer heating circuit positioned near the writer portion. The heating circuit includes at least two resistive elements.

In certain embodiments, a slider includes a single layer heating circuit including at least two heating element resistors.

DETAILED DESCRIPTION

The present disclosure relates to devices, systems, and methods including heating circuits with multiple resistive elements. Heating circuits can be used in read/write heads to induce protrusion of a media-facing surface of the read/write head.

Figure 1:
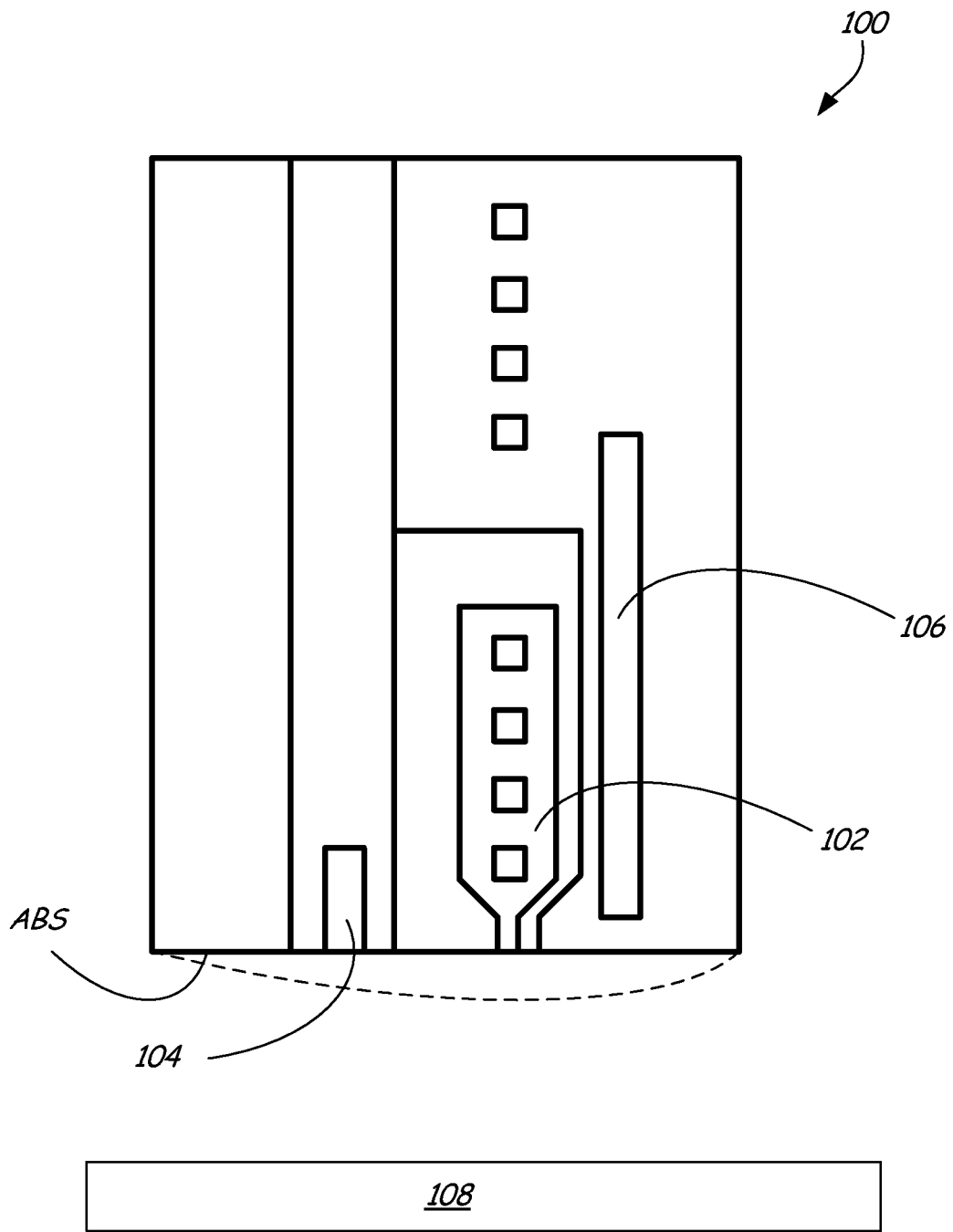
FIG. 1 provides a side view of a slider, in accordance with certain embodiments of the present disclosure.

During operation of a data storage device, read/write heads are positioned in close proximity to recording media to read and write data to the media. To control a distance between the head's reader or writer and the media, the head can include one or more heating circuits. FIG. 1 shows ahead 100 having a writer portion 102 and a reader portion 104. The writer portion 102 includes a writer and coils positioned around or near the writer. A heating circuit 106 is positioned near the writer portion 102. When current is passed through the heating circuit 106, the circuit 106 provides localized heat to control thermal protrusion and the writer's shape at an air bearing surface (ABS). An example of thermal protrusion along a down-track direction is shown as a dotted line in FIG. 1, protruding towards recording media 108. Alternatively, or in addition to the heating circuit 106, a heating circuit can be placed near the reader portion 104.

Certain embodiments of the present disclosure are accordingly directed to systems, devices, and methods for controlling protrusion shapes.

Figure 2:
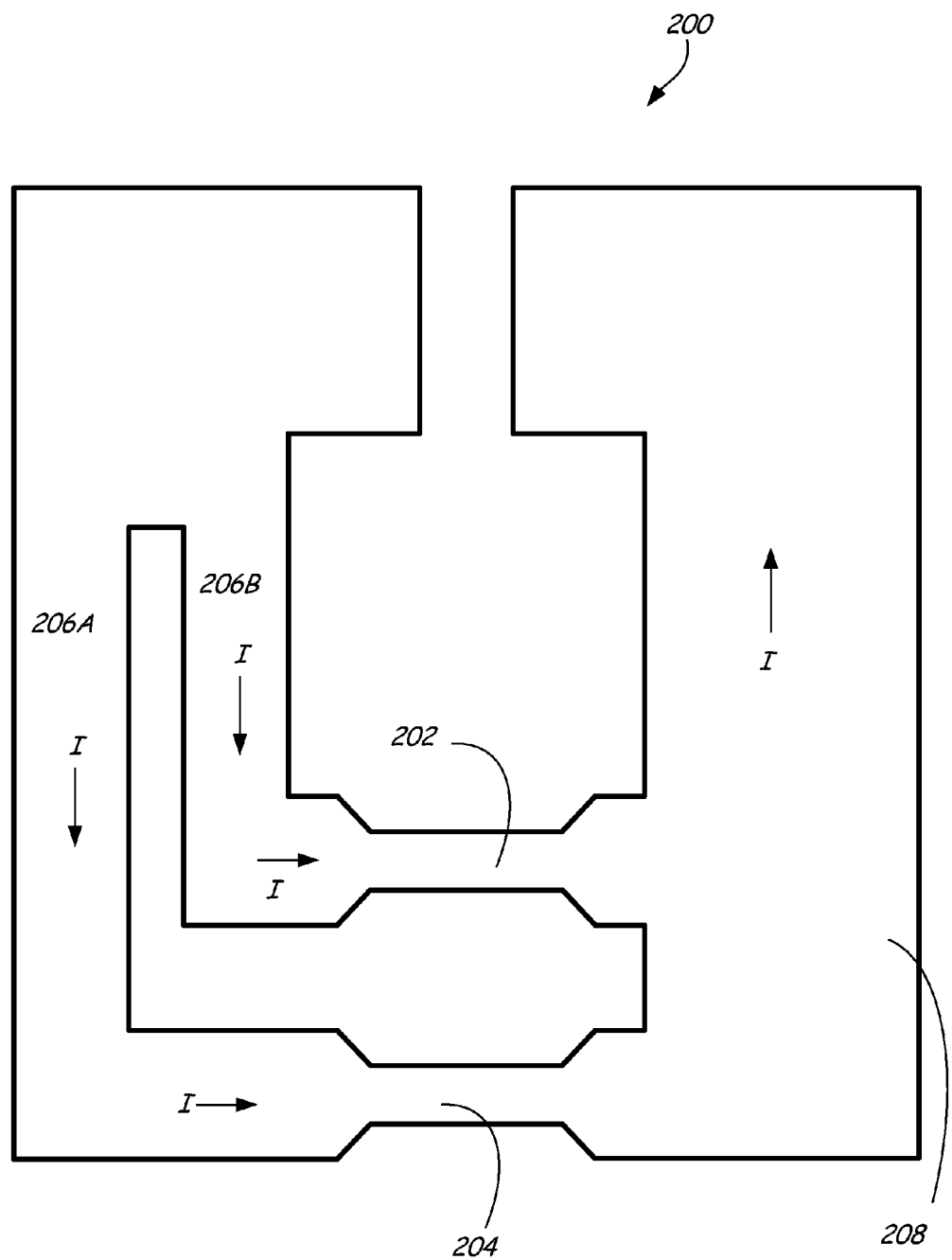
FIG. 2 provides a top view of a heating circuit, in accordance with certain embodiments of the present disclosure.

FIG. 2 provides atop view of a heating circuit 200 having first (upper) and second (lower) resistive elements 202, 204 between a set of lead legs 206A, 206B and lead leg 208. In certain embodiments, the heating circuit 200 is a single layer of material, which can be nickel-chrome, nickel-copper, or tungsten, for example. The single layer heating circuit 200 can be a substantially uniform. thickness. Current I enters the heating circuit 200 and passes through the first set of lead legs 206A, 206B. The current I is divided between the legs 206A, 206B. Current I flows across the upper resistive element 202 and the lower resistive element 204, which are connected in parallel to each other. As current I passes across the upper and lower resistive elements 202, 204, the heating circuit 200 provides localized heat to regions of a head at or near the heating element resistors 202, 204. After passing across the resistive elements 202, 204, current I passes through the lead leg 208 and out of the heating circuit 200.

Providing multiple resistive elements in a heating circuit can increase the reliability of the circuit by distributing current between or among multiple resistive elements, thereby reducing a maximum current density in either resistive element. Further, multiple resistors permit a protrusion profile of a slider to be tuned. For example, modifying a length and/or width of one or both of the resistive elements can change current density distribution (i.e. temperature gradients) of the resistive elements to shape the cross-track protrusion (e.g., width, sharpness in the cross-track direction). In general, as a resistive element's width is decreased, resistance increases and more heat is generated. If current density is highest in a resistive element closest to an air bearing surface (ABS) and the resistive element is narrow and short in nature, then the protrusion shape will be narrow and sharp. On the other hand, if the current density is greatest in a resistive element furthest from the ABS, then the cross-track protrusion shape will be broad and rounded.

Modifying a resistive element's shape can change a stroke efficiency of protrusion—that is, an amount of current inputted to induce a certain distance of protrusion. For example, a high stroke efficiency requires a small amount of current to cause a large stroke or protrusion height. Concentrating current density on a lower resistor, a protrusion shape can be made sharper with less overall effort (current). The protrusion shape would occur quicker because the lower resistor would be closer to the ABS and transducer metals.

Current density through multiple resistive elements can also be modified by changing the shape of leads or legs supplying current to the resistive elements, instead or in addition to modifying widths and lengths of resistive elements.

As shown in FIG. 2, the upper and lower resistive elements 202, 204 have substantially the same dimensions as each other (e.g., width, length), as do the first set of lead legs 206A, 206B. As a result, current density is divided equally across the upper and lower resistive elements 202, 204. The amount of heat generated by each resistive element should be substantially similar. As with other embodiments disclosed in this description, the heating circuit 200 can be implemented in a slider close to a reader to induce protrusion of the reader, thereby reducing reader head-media spacing at the reader. Alternatively, the heating circuit 200 can be positioned near a writer to reduce spacing between a write pole tip and the media. The width and length of lead legs 206A, 206B are adjusted and balanced so that heating element resistors 202, 204 have equal current density (i.e., balanced current density).

Figure 3:
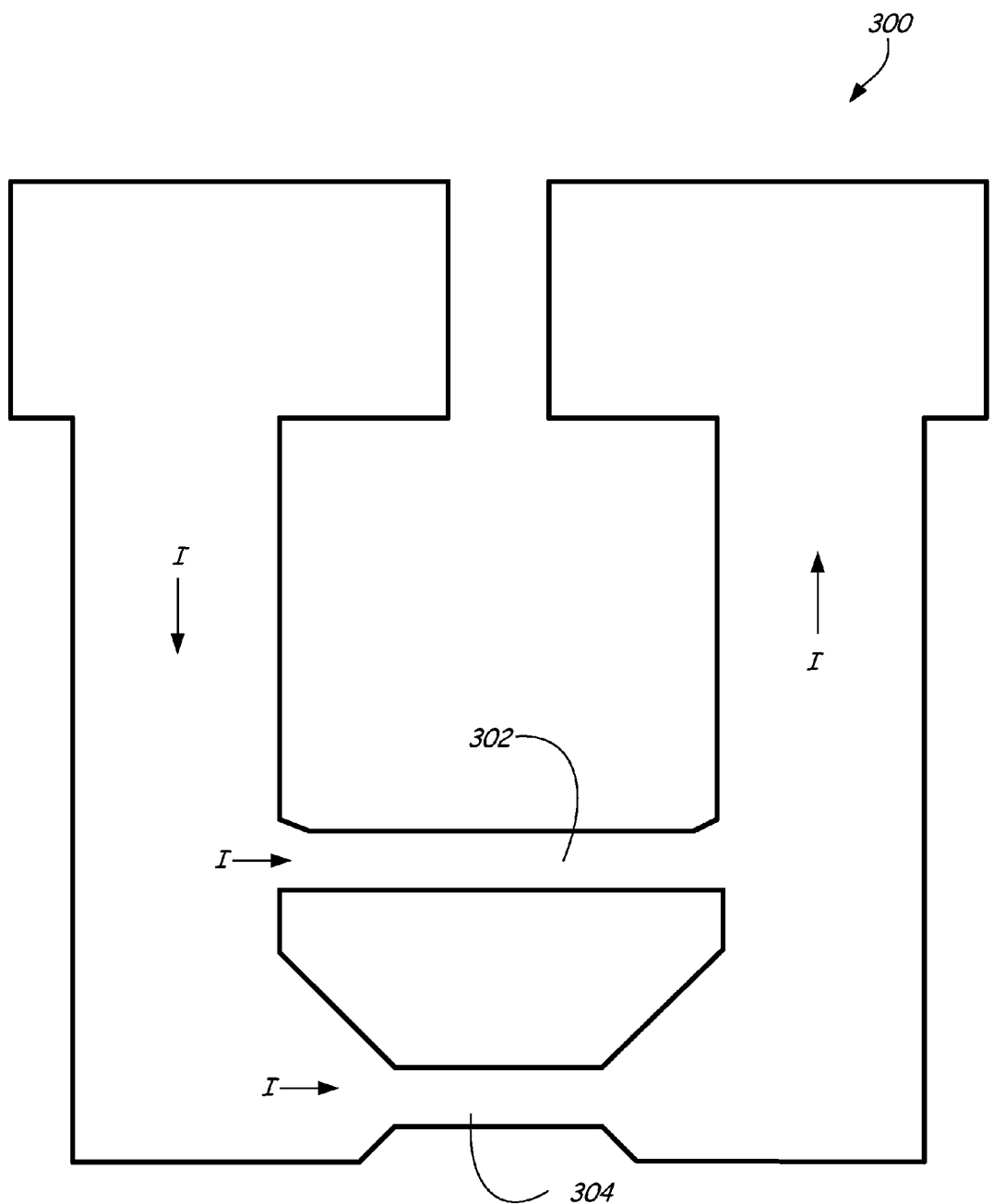
FIG. 3 provides a top view of a heating circuit, in accordance with certain embodiments of the present disclosure.

FIG. 3 provides a top view of a heating circuit 300 having an upper resistive element 302 and a lower resistive element 304 between first and second sets of lead legs 306, 308. The upper resistive element 302 is longer and narrower than the lower resistive element 304. As current passes through the resistive elements 302, 304, the upper resistive element 302 has a higher current density and therefore produces more heat than the lower resistive element 304. This results in a wider and broader protrusion shape as the upper resistive element 302 is located farther from an air bearing surface.

Figure 4:
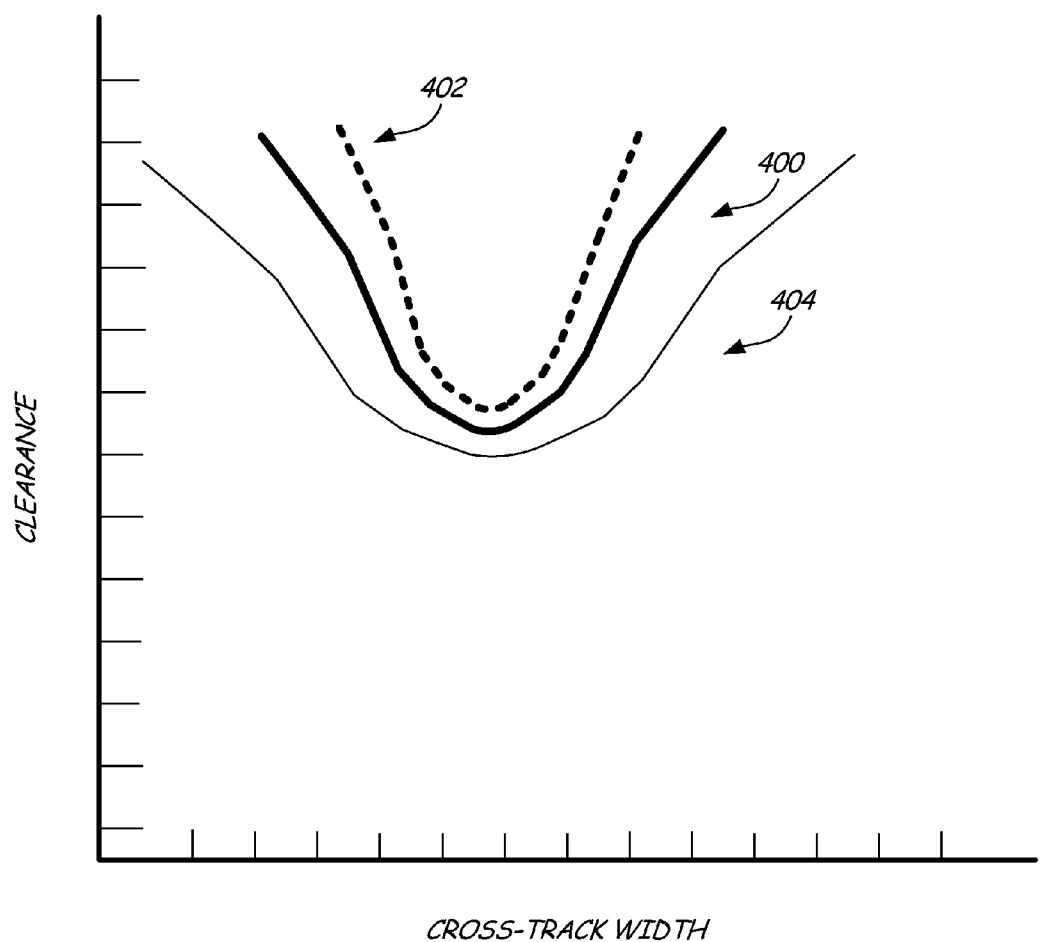
FIG. 4 provides a graph of a protrusion profile, in accordance with certain embodiments of the present disclosure.

FIG. 4 provides a graph showing an exemplary profile 400 of a protrusion shape of a heating circuit with a similar design to the heating circuit of FIG. 3 compared to a profile 402 (in dotted lines) of a protrusion shape of a heating circuit with a similar design to that of FIG. 2 compared to a profile 404 (in a thin line) with yet an even broader protrusion shape. As shown in FIG. 4, profile 400 is broader than profile 402. This difference in profiles is due to the profile 400 representing a protrusion shape induced by a heating circuit design having an upper resistive element with a higher current density than a lower resistive element. The maximum current density of the heating circuit is through the upper resistive element positioned farthest away from an air bearing surface.

Figure 5:
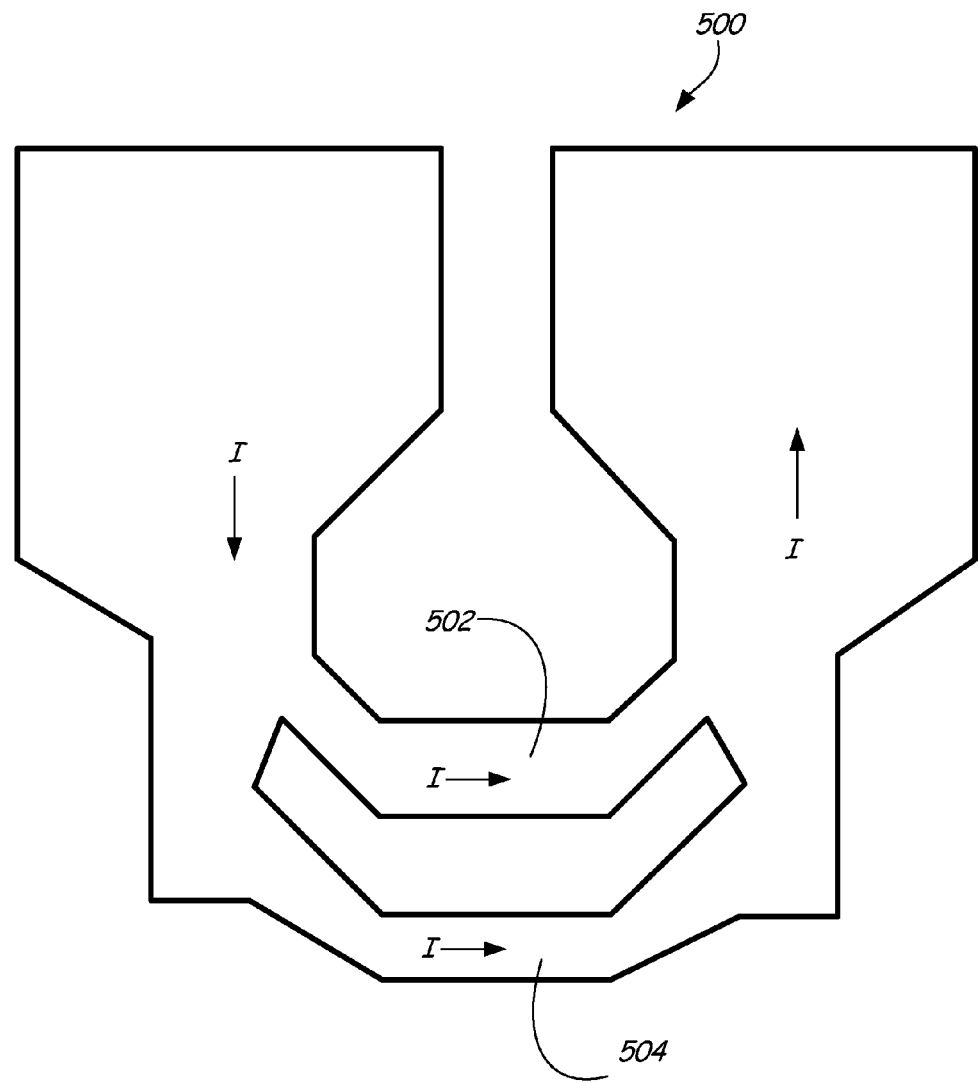
FIG. 5 provides a top view of a heating circuit, in accordance with certain embodiments of the present disclosure.

FIG. 5 provides a top view of a heating circuit 500 having first and second resistive elements 502, 504. The upper resistive element 502 is wider and narrower than the lower resistive element 504. Moreover, the resistive elements 502, 504 are shaped to further alter a shape of protrusion. As current passes through the resistive elements 502, 504, the lower resistive element 504 has a higher current density and therefore produces more heat than the upper resistive element 502. This design results in a sharper protrusion (e.g., more V-shaped profile).

Figure 6:
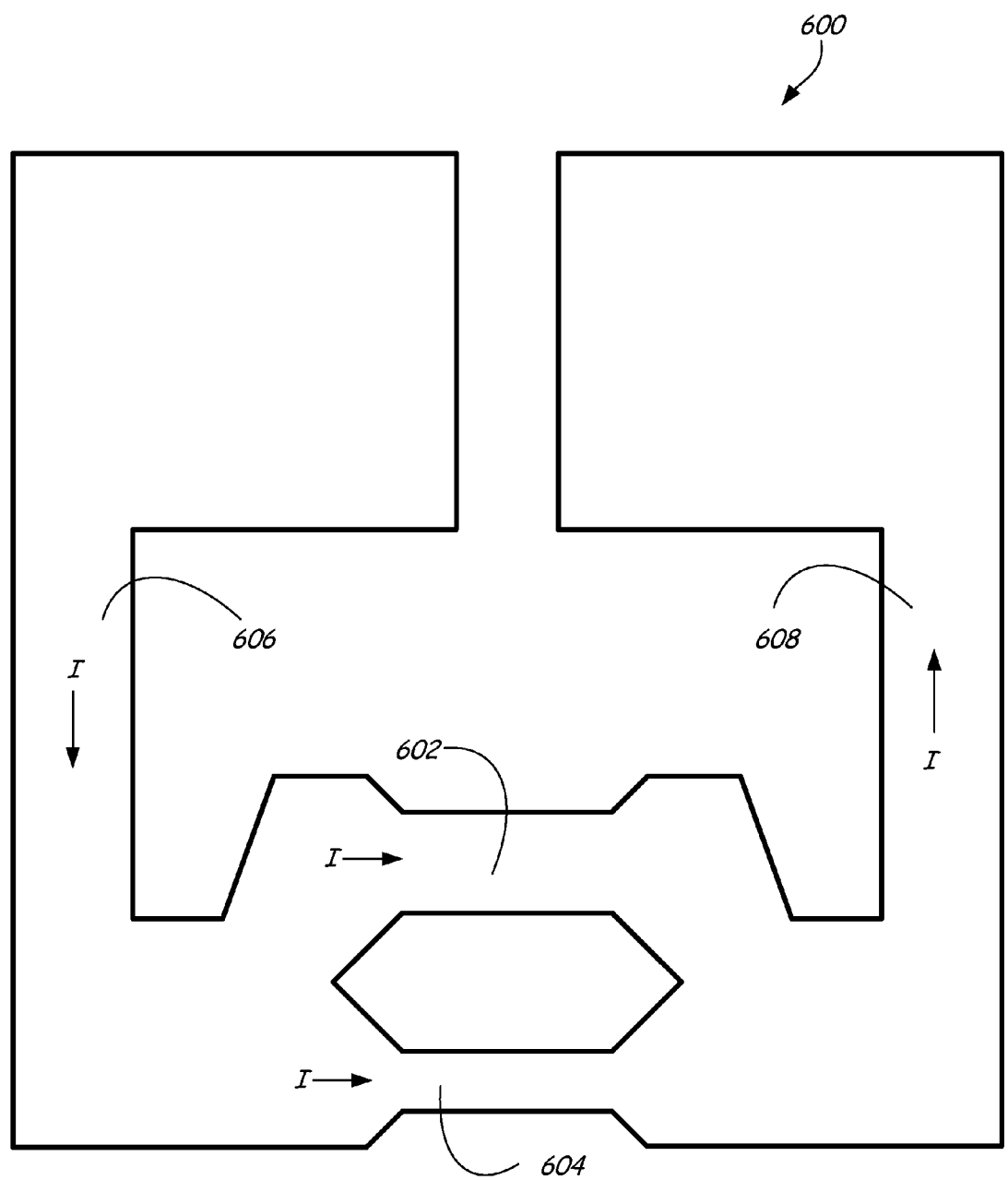
FIG. 6 provides a top view of a heating circuit, in accordance with certain embodiments of the present disclosure.

FIG. 6 provides a side view of a heating circuit 600 having first and second resistive elements 602, 604 between leads 606, 608. The upper resistive element 602 is wider than the lower resistive element 604. As current passes through the resistive elements 602, 604, the lower resistive element 604 has a higher current density and therefore produces more heat than the upper resistive element 602. This design results in a sharper protrusion (e.g., more V-shaped profile).

As shown in the above embodiments, heating circuits can have a variety of designs where the shapes and positions of leads, lead legs, and resistive elements are modified too tune the shape of protrusion profiles and to increase the reliability of the heating circuit. It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A head comprising:
a writer portion having coils positioned near a writer;
a reader portion separate from the writer portion; and
a single-layer heating circuit positioned near the reader portion or the writer portion, the heating circuit including at least two heating element resisters connected in parallel to divide current through the at least two heating element resisters.

2. The head of claim 1, wherein the at least two heating element resisters includes an upper resistive element and a lower resistive element.

3. The head of claim 1, wherein a first heating element resister has a higher resistance than a second heating element resister.

4. The head of claim 1, wherein the single layer heating circuit has a uniform thickness.

5. The head of claim 2, wherein the upper heating element resister is narrower than the lower heating element resister.

6. The head of claim 2, wherein the lower heating element resister is narrower than the upper heating element resister.

7. The head of claim 2, wherein the upper heating element resister is longer than the lower heating element resister.

8. The head of claim 2, wherein the lower heating element resister is longer than the upper heating element resister.

9. The head of claim 1, further comprising a second heating circuit positioned near a reader portion.

10. A slider comprising:
a single layer heating circuit including at least two heating element resistors connected in parallel to distribute current between the at least two heating element resisters.

11. The slider of claim 10, wherein the circuit includes at least two input leads configured to divide current density substantially equally between the at least two input leads.

12. The slider of claim 10, wherein a first heating element resistor has a higher resistance than a second heating element resistor.

13. The slider of claim 10, wherein the at least two heating element resistors have a substantially equal resistance.

14. The slider of claim 10, wherein the single layer heating circuit comprises one of nickel-chrome, nickel-copper, or tungsten.

15. The slider of claim 10, further comprising:
a second single layer heating circuit including at least two heating element resistors.

16. The slider of claim 15, wherein the first single layer heating circuit is positioned adjacent a writer and the second single layer heating circuit is positioned adjacent a reader.

17. The slider of claim 10, wherein the single layer heating circuit has a uniform thickness.

18. The head of claim 1, wherein the heating circuit further includes at least two input leads, each input lead directing current to a single resistive element.

19. The slider of claim 10, wherein the single layer heating circuit is configured to receive an incoming current, wherein the at least two heating element resisters distribute the incoming current between the at least two heating element resistors.

* * * * *